United States Patent [19]

Kyogoku et al.

[11] Patent Number: 5,700,747
[45] Date of Patent: Dec. 23, 1997

[54] EXHAUST GAS CLEANING CATALYST COMPLEX AND METHOD FOR PRODUCING THE SAME

[75] Inventors: Makoto Kyogoku, Hiroshima; Hideharu Iwakuni, Higashihiroshima; Akihide Takami, Hiroshima, all of Japan

[73] Assignee: Mazda Motor Corporation, Hiroshima-ken, Japan

[21] Appl. No.: 533,819

[22] Filed: Sep. 25, 1995

[30] Foreign Application Priority Data

Sep. 26, 1994 [JP] Japan ............... P 6-229122

[51] Int. Cl.$^6$ ........................... B01J 29/06
[52] U.S. Cl. ............... 502/66; 502/64; 502/439; 423/212; 423/235
[58] Field of Search ........... 423/212, 235; 502/66, 439, 64

[56] References Cited

U.S. PATENT DOCUMENTS

| | | | |
|---|---|---|---|
| 4,134,860 | 1/1979 | Hindin et al. | 252/466 PT |
| 4,157,316 | 6/1979 | Thompson et al. | 252/462 |
| 4,171,287 | 10/1979 | Keith | 252/462 |
| 4,171,288 | 10/1979 | Keith et al. | 252/462 |
| 4,637,995 | 1/1987 | DeAngelis et al. | 502/304 |
| 4,675,308 | 6/1987 | Wan et al. | 502/304 |
| 4,738,947 | 4/1988 | Wan et al. | 502/34 |
| 5,039,650 | 8/1991 | Yamada et al. | 502/304 |

FOREIGN PATENT DOCUMENTS 4-197447  7/1992  Japan .

*Primary Examiner*—Deborah Jones
*Assistant Examiner*—Amy M. Harding

[57] ABSTRACT

An object is to elevate the NOx cleaning rate and heat resistance of an exhaust gas cleaning catalyst complex which comprises a noble metal catalyst supported on zeolite. Ni is supported in the form of NiO powder on said zeolite. Said NiO acts as a cocatalyst without the coverage of the activation site of the catalyst complex and closure of the gas passage by said NiO so as to elevate the NOx cleaning rate and heat resistance.

18 Claims, 2 Drawing Sheets

EXHAUST GAS CLEANING CATALYST COMPLEX AND METHOD FOR PRODUCING THE SAME

BACKGROUND OF THE INVENTION

1. Field of the Invention

The present invention relates to an exhaust gas cleaning catalyst complex to clean NOx (nitrogen oxides) in the exhaust gas, for example, of the automobile engine and a method for producing said catalyst complex.

2. Description of Related Art

The exhaust gas cleaning catalyst complexes to clean NOx (nitrogen oxides) in the exhaust gas are well known in which at least one ((a) component) selected from the group composed of hydroxides, carbonates, and bicarbonates of alkali metals or alkaline earth metals, and at least one or more ((b) component) selected from the group composed of a transition metal support such as Pt and Ni and oxides and halides thereof are supported on zeolite (Japanese patent publication Tokkaihei No. 4-197447 examined). The exhaust gas cleaning catalyst complex is produced according to the method in which zeolite is immersed in the solution in which, for example, platinum chloride hexahydrate is dissolved, pulled up and dried by heating, then immersed in the solution of lithium hydroxide and the like, pulled up and dried by heating.

The prior art mentioned above is intended to enhance the absorption of NOx in the exhaust gas by (a) component and to decompose said NOx by (b) component.

It is an object of the present invention to enhance a NOx cleaning rate by using a noble metal catalyst and NiO together, further to enhance the heat resistance of the catalyst complex.

That is, the inventor found experimentally that when Pt as a main catalyst and Ni as a cocatalyst are supported on zeolite, if the amount of Ni supported is small, Ni reduces a little the activity of Pt, with the result that the activation temperature of the catalyst complex can be shifted to the higher temperature without significant decrease of the NOx cleaning rate. However, if the amount of Ni supported increases, the NOx cleaning rate decreases significantly. The problem becomes conspicuous in the case that the amount of HC is small in the exhaust gas.

In the case that Pt and Ni are supported together on zoolite, usually, the zoolite on which Pt is supported is impregnated with Ni solution. However, according to the above-mentioned method, Ni solution is attached to the entire zeolite on which Pt is supported. Ni changes into NiO to form NiO film due to the subsequent calcination or the heat of the exhaust gas having a high temperature. The NiO film covers the activation site (Pt) of the catalyst complex and closes the gas passage (microphoto and mesophore of zeolite). Therefore, even if Ni itself is useful as a cocatalyst by nature, as mentioned above, Ni changes into NiO to cover the activation site of the catalyst and ruin it, further to close the gas passage and prevent the passage or absorption of HC, resulting in the significant decline of said NOx cleaning rate.

SUMMARY OF THE INVENTION

According to the present invention, Ni is supported on a crystalline metal-bearing silicate, namely metallic atom-bearing silicate or metallic atom contained silicate, having small pores, such as zeolite, in the form of nickel oxide powder instead of being supported by impregnation in the form of Ni solution. Therefore, the activation site of the catalyst complex is secured and said gas passage is prevented from being closed, with the result that Ni can be used effectively to enhance the activity and the heat resistance of the catalyst complex.

According to a first aspect of the present invention, there is provided an exhaust gas cleaning catalyst, in which a catalyst metal is supported on a crystalline metal-bearing silicate, to decompose NOx in the exhaust gas under the presence of HC, wherein said catalyst metal comprises a noble metal and nickel is supported in the form of a nickel oxide powder together with said noble metal on said metal-bearing silicate.

According to the present invention, Ni is supported in the form of nickel oxide powder on the metal-bearing silicate. Therefore, even if there is a part on the metal-bearing silicate where the nickel oxide powder distributes densely, there is space among the powders, thereby, HC and NOx can pass through said space to reach the activation site of the catalyst complex and to reach the microphore and mesophore of the metal-bearing silicate. That is, said nickel oxide powder does not cover the activation site of the catalyst complex to prevent HC and NOx from reaching said site or not to close entirely the gas passage. On the contrary, said nickel oxide powder enhances the activity of the catalyst complex due to the interaction with the noble metal catalyst as a main catalyst metal and acts efficiently as a cocatalyst to control heat deterioration of said catalyst metal (for example, sintering).

Said metal-bearing silicate may be aluminosilicate (zeolite) in which Al is used as a metal forming a framework of the crystal (crystal lattice) or metal-bearing silicate having, as a material forming a framework, other metals such as Ga, Ce, Mn, Tb and the like instead of Al or with Al. Zeolite may be A-type, X-type, Y-type, moldenite or ZSM-5. The noble metal catalyst mentioned above is not limited to a specified material. The noble metal such as Pt, Ir, Rh and the like can be used individually or in combination.

In the exhaust gas cleaning catalyst complex according to the present invention, a noble metal catalyst is supported on a crystalline metal-bearing silicate and Ni is supported in the form of nickel oxide powder on said metal-bearing silicate. Accordingly, this makes it possible to use nickel oxide as a cocatalyst effectively and simultaneously to elevate NOx cleaning rate and a heat resistance of the catalyst complex without prevention of the catalytic action of the metal-bearing silicate and the noble metal catalyst.

In a preferred embodiment, the exhaust gas cleaning catalyst complex is characterized by that the ratio by weight of Ni to said metal-bearing silicate is 2/100 to 51/100.

When the ratio by weight of Ni is 2/100 or more, the effect obtained by the nickel oxide powder supported on the metal-bearing silicate is quite clear. The Nickel oxide powder hardly closes the gas passage in the metal-bearing silicate but closes it to some extent. Then excess nickel oxide is disadvantage in cleaning exhaust gas, therefore, the ratio by weight of Ni is 51/100 or less. Based on the above idea, said ratio by weight of Ni is preferably 5/100 to 46/100.

According to a second aspect of the present invention, there is provided a method for producing an exhaust gas cleaning catalyst complex which comprises a noble metal and nickel oxide powder supported on a crystalline metal-bearing silicate, characterized in that nickel oxide powder is supported on said metal-bearing silicate after a noble metal is supported on it.

The reason why a noble metal is supported on the metal-bearing silicate before nickel oxide powder is supported on it is that the decomposition reaction of NOx occurs mainly on the surface of the metal-bearing silicate and the noble metal which promotes said reaction is ensured to be supported on the surface of the silicate. The reason why Ni is supported on the metal-bearing silicate in thee form of nickel oxide powder, not by impregnating the silicate in Ni solution and changing the supported Ni into nickel oxide, is that the film of nickel oxide is prevented from forming on the surface of the metal-bearing silicate, covering the activation site and closing the gas passage.

In the method for producing an exhaust gas cleaning catalyst complex according to the present invention, the nickel oxide powder is supported on a metal-bearing silicate after a noble metal is supported on it. Accordingly, this makes it possible to have the noble metal catalyst supported certainly on the surface of the metal-bearing silicate and to have nickel oxide supported on the metal-bearing silicate without the coverage of the activation site of the catalyst complex and the closure of the gas passage of the metal-bearing silicate, resulting in achievement of the desired effect.

In a preferred embodiment of the present invention, there is provided a method for producing an exhaust gas cleaning catalyst complex which comprises a noble metal and nickel oxide powder supported on a crystalline metal-bearing silicate, which comprises the steps of:

having a noble metal supported on the metal-bearing silicate;

having said metal-bearing silicate supported on the monolithic carrier by wash-coating; and then wash-coating said monolithic carrier with nickel oxide powder in order that said nickel oxide powder is supported on said metal-bearing silicate.

According to the preferred embodiment, a noble metal is supported on the metal-bearing silicate, thereafter, the nickel oxide powder is supported on it. Therefore, the effect mentioned above can be achieved. Moreover, the metal-bearing silicate on which the noble metal is supported is supported on the monolithic carrier by wash-coating, thereafter, the resultant carrier is wash-coated with nickel oxide powder, with the result that nickel oxide powder can be supported on the metal-bearing silicate without fail, compared with the case that both the metal-bearing silicate and nickel oxide powder are supported on the monolithic carrier at the same time by wash-coating.

Therefore, according to a third aspect of the present invention, there is provided an exhaust gas cleaning catalyst complex which comprises a noble metal catalyst supported on a crystalline metal-bearing silicate, a monolithic carrier supporting said metal-bearing silicate and a nickel oxide powder supported on said metal-bearing silicate.

BRIEF DESCRIPTION OF DRAWINGS

These and other objects and features of the present invention will become clear from the following description taken in conjugation with the preferred embodiments thereof with reference to the accompanying drawings in which.

DESCRIPTION OF THE BEST MODE

The following description will be directed to an exhaust gas cleaning catalyst complex and a method for producing said catalyst complex according to the embodiment of the invention.

Preparation of an Exhaust Gas Cleaning Catalyst Complex According to the Embodiment of the Invention The metal catalysts of Pt and Rh were weighed such that the ratio by weight of Pt to Rh was 75 to 1 and the amount of the metal catalysts was 4.5 g to 1 liter of the catalyst complex. The metal catalysts were supported on the metal-bearing silicate of H-type ZSM5 ($SiO_2/Al_2O_3$=80) by the spray-dry method and heated at 300° C. to prepare main catalyst powder. 20 wt % of alumina hydrate was added as a binder to the resultant main catalyst powder and further, the right amount of water was added to prepare slurry for wash-coating. A honeycomb carrier made of cordierite was dipped in the resultant slurry and pulled up. An extra amount of slurry was blown off, and then the coating layer was dried.

Next, NiO powder was added to ion exchange water. A binder (alumina), the ratio by weight of which to NiO powder was 1/10, was added to the resultant mixture to prepare slurry for wash-coating. Said honeycomb carrier was dipped in the slurry and pulled up. An extra amount of slurry was blown off, and then the carrier was calcinated in the air at 500° C. for 2 hours to obtain the desired honeycomb catalyst complex. The amount of NiO was adjusted in a way that the amount of Ni was 25/100 (the ratio by weight) of H-type ZSM5.

Preparation of an Exhaust Gas Cleaning Catalyst Complex According to Comparative Examples Said main catalyst powder was supported on the similar honeycomb carrier by wash-coating and calcinated at 500° C. for 2 hours to prepare the honeycomb catalyst complex of Comparative example 1.

Said main catalyst powder was supported on the similar honeycomb carrier by wash-coating, impregnated with nickel nitrate solution and dried thoroughly, thereafter, calcinated at 500° C. for 2 hours to prepare the honeycomb catalyst complex of Comparative example 2. The amount of Ni in the catalyst complex was 25/100 (the ratio by weight) of H-type ZSM5 just like Example as mentioned above.

Evaluation 1 of the Catalyst Complex

Figure 1:
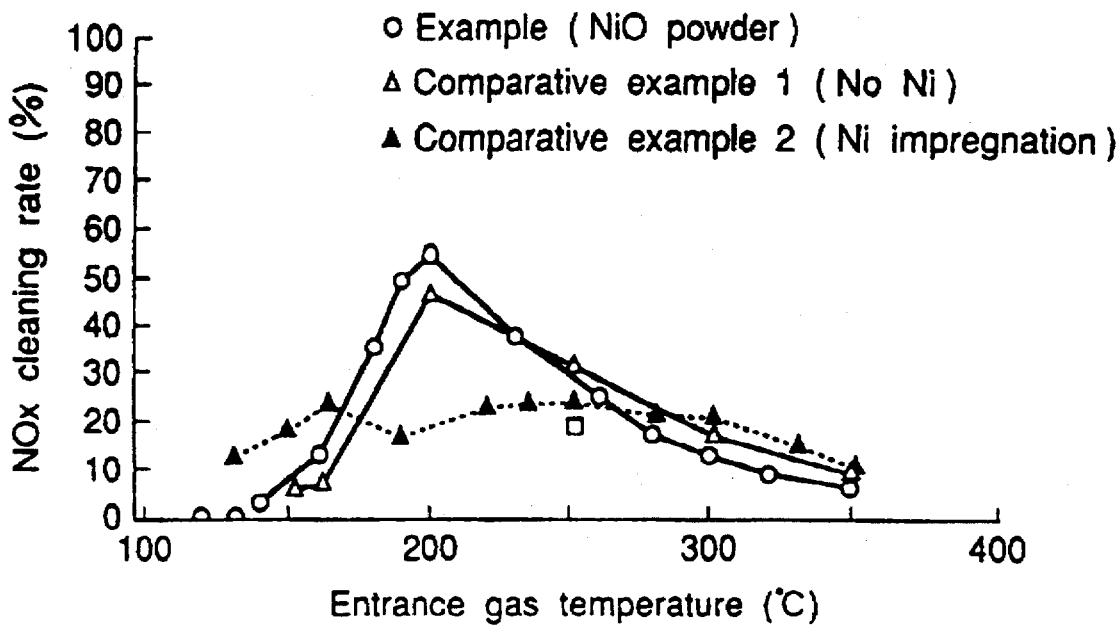
FIG. 1 is a graph showing NOx cleaning properties at the fresh time according to Example and Comparative examples 1 and 2.

The NOx cleaning rate was measured with the honeycomb catalyst complexes of Example and Comparative examples 1 and 2 under the conditions as mentioned below. FIG. 1 shows the result of the NOx cleaning rate measurement.

Measuring Conditions gas composition

HC; 500 ppmC, $O_2$; 7%, NOx; 250 ppm, the rest; $N_2$
space velocity (SV)
55000h-1

As shown in FIG. 1, the peak magnitude (which appears around 200° C. of the catalyst entrance temperature) of NOx cleaning rate of Example in which NiO powder is supported is higher than that of Comparative example 1 in which Ni is not supported. On the other hand, in the case of Comparative example 2, the same amount of Ni as Example is supported, but the NOx cleaning rate is relatively low. The reason why the NOx cleaning rate of Comparative example 2 is relatively low may be that the salt of Ni supported on H-type ZSM5 by impregnation changes into NiO due to the subsequent calcination to cover the activation site and close the gas passage of H-type ZSM5. Example shows that Ni supported in the form of NiO powder on the H-type ZSM5 enhances effectively the NOx cleaning rate.

Evaluation 2 of the Catalyst Complexes

Figure 2:
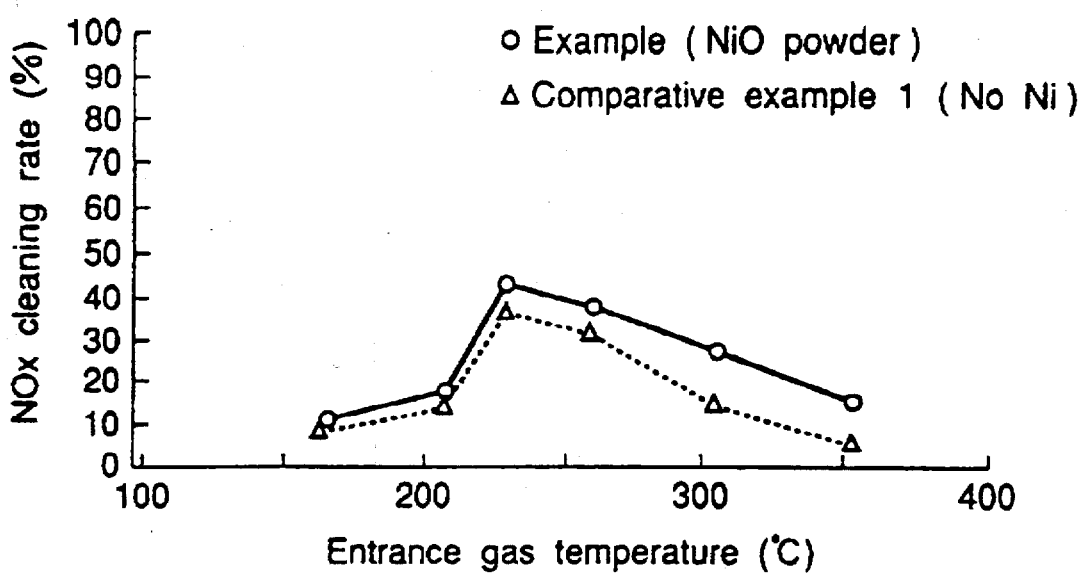
FIG. 2 is a graph showing NOx cleaning properties after heat treatment according to Example and Comparative example 1.

The NOx cleaning rate was measured with the honeycomb catalyst complexes of Example and Comparative example 1 heated at 900° C. for 50 hours under the conditions as mentioned below. FIG. 2 shows the result of the NOx cleaning rate measurement.

Measuring Conditions gas composition

HC; 4000 ppmC, $O_2$; 7%, NOx; 250 ppm, CO; 0.15%, the rest; $N_2$ space velocity (SV)

55000h-1

FIG. 2 shows that the NOx cleaning rate of Example is higher than that of Comparative example 1 over the whole temperature and also shows NiO powder supported enhances the heat resistance effectively.

Evaluation 3 of the Catalyst Complexes

Full-brick (a honeycomb carrier 1.3 liter made of cordierite) catalyst complexes were prepared in the same way as Example and Comparative examples 1 and 2 mentioned above. The NOx cleaning rate was measured by means of bench method (in which the automobile engine was fixed on the bench and driven, and the exhaust gas of the engine was passed on the catalyst complex) under the conditions that A/F=2 and the catalyst entrance gas temperature was 280° C. FIG. 1 shows the results. The catalyst complexes were not subjected to heat treatment which was carried out in the evaluation 2.

TABLE 1

|  | NOx cleaning rate at 2000 ppmC of HC exhaust | NOx cleaning rate at 500 ppmC of HC exhaust |
| --- | --- | --- |
| Example | 58% | 55% |
| Comparative example 1 | 50% | 47% |
| Comparative example 2 | 62% | 44% |

Table 1 shows that in the case that the amount of HC exhausted from the engine is large (in the case of 2000 ppmC), the NOx cleaning rate of Example and Comparative example 2 in which Ni is supported is higher than that of Comparative example 1 in which Ni is not supported. The reason why the NOx cleaning rate of Comparative example 2 is high may be that even if the gas passage is partly closed due to the formation of NiO film, a lack of HC does not occur because of large quantities of HC. This idea is supported by the fact that in the case that the amount of HC is small (in the case of 500 ppmC), the NOx cleaning rate of Comparative example 2 is low.

On the other hand, even if the amount of HC is small (in the case of 500 ppmC), the NOx cleaning rate of Example is high. Thus, it is shown that Ni supported in the form of NiO powder on the metal-bearing silicate enhances effectively the NOx cleaning rate without said closure of the gas passage.

(The Amount of Ni)

Figure 3:
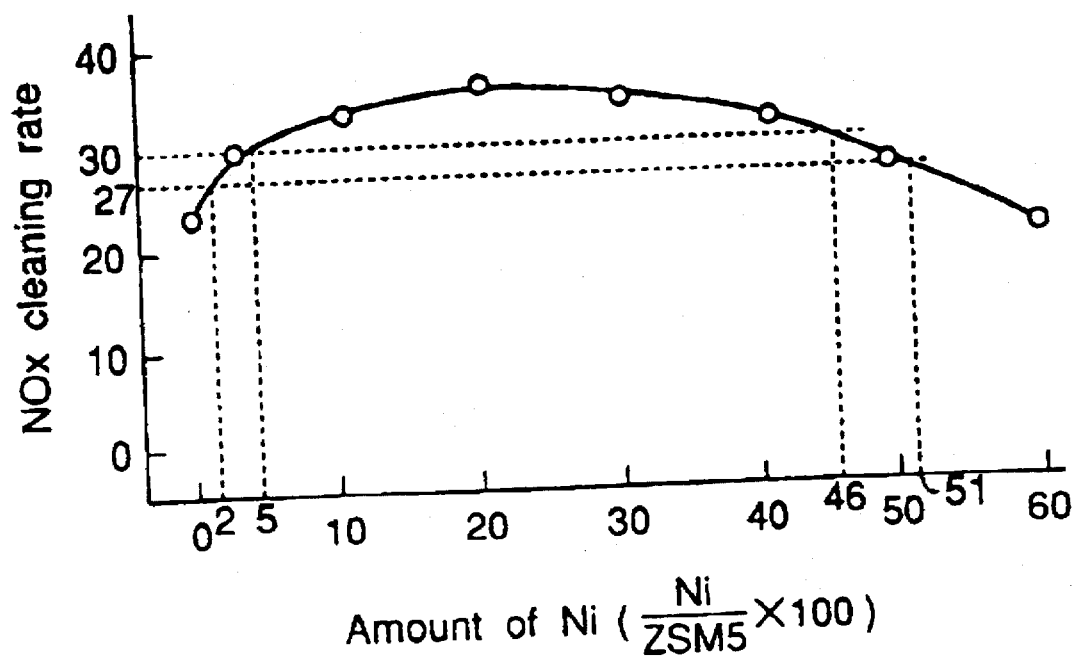
FIG. 3 is a graph showing the relation between the amount of NI and NOx cleaning rate.

Eight kinds of honeycomb catalyst complexes were prepared in the same way as above-mentioned Example. They were different one another in the amount of Ni. The NOx cleaning rate was measured with each catalyst complex under the same conditions as above-mentioned Evaluation 1 and at 250° C. of the catalyst entrance gas temperature. FIG. 3 shows the result.

FIG. 3 shows that the more the amount of Ni is, the higher the NOx cleaning rate is. However, when the amount of Ni becomes excessive, the NOx cleaning rate falls. This may be attributed to a reason described below: When Ni is supported in the form of NiO on the metal-bearing silicate, the problem of closing the gas passage is reduced, still, the excessive amount of NiO causes the closure of the gas passage. FIG. 3 also shows that the ratio by weight of Ni to said silicate may be 2/100/ to 51/100 to obtain 27% or more of the NOx cleaning rate and may be 5/100 to 46/100 to obtain 30% or more of the NOx cleaning rate.

Further, the method in which a catalyst metal is supported on the metal-bearing silicate by hydrolysis can be used for the support of the catalyst metal on the metal-bearing silicate. Therefore, the catalyst metal can be dispersed highly so that the sintering due to heat of said catalyst metal can be prevented and the heat resistance of the catalyst complex can be enhanced.

What is claimed is:

1. An exhaust gas cleaning catalyst complex for decomposing $NO_x$ in an exhaust gas under the presence of HC, said complex comprising:

a first layer on a carrier and a second component carried on said first layer wherein the first layer is a noble metal catalyst layer comprising a noble metal catalyst supported on a crystalline metal-bearing silicate and wherein the second component is nickel in the form of nickel oxide.

2. The exhaust gas cleaning catalyst complex according to claim 1, wherein the ratio by weight of Ni to said metal-bearing silicate is 2/100 to 51/100.

3. The exhaust gas cleaning catalyst complex according to claim 2, wherein the ratio by weight of Ni to said metal-bearing silicate is 5/100 to 46/100.

4. The exhaust gas cleaning catalyst complex according to claim 3, wherein said noble metal catalyst comprises Pt.

5. The exhaust gas cleaning catalyst complex according to claim 4, wherein said noble metal catalyst further comprises Rh.

6. An exhaust gas cleaning catalyst complex comprising:

a first layer on a monolithic carrier and a second component carried on said first layer wherein the first layer is a noble metal catalyst layer comprising a noble metal catalyst supported on a crystalline metal-bearing silicate and wherein the second component is a nickel oxide power layer.

7. The exhaust gas cleaning catalyst complex according to claim 6, wherein the ratio by weight of Ni to said metal-bearing silicate is 2/100 to 51/100.

8. The exhaust gas cleaning catalyst complex according to claim 7, wherein the ratio by weight of Ni to said metal-bearing silicate is 5/100 to 46/100.

9. The exhaust gas cleaning catalyst complex according to claim 8, wherein said noble metal catalyst comprises Pt.

10. The exhaust gas cleaning catalyst complex according to claim 9, wherein said noble metal catalyst further comprises Rh.

11. A method for producing an exhaust gas cleaning catalyst complex comprising a first layer on a carrier and a second component carried on said first layer wherein the first layer is a noble metal catalyst layer comprising a noble metal catalyst supported on a crystalline metal-bearing silicate and wherein the second component is nickel oxide powder, said method comprising the steps of:

preparing a powder comprising a noble metal catalyst supported n a metal-bearing silicate;

coating a carrier with said powder to form the first noble metal catalyst layer; and support nickel oxide powder on said first noble metal catalyst layer.

12. The method for producing an exhaust gas cleaning catalyst complex according to claim 11, further comprising a step of supporting said noble metal catalyst layer on an monolithic carrier by wash-coating before the step of supporting said nickel oxide powder on said metal-bearing silicate.

13. The method for producing an exhaust gas cleaning catalyst complex according to claim 12, wherein supporting said nickel oxide powder on said noble metal catalyst layer is carried out by wash-coating.

14. The method for producing an exhaust gas cleaning catalyst complex according to claim 13, wherein the ratio by weight of Ni to said metal-bearing silicate is 2/100 to 51/100.

15. The method for producing an exhaust gas cleaning catalyst complex according to claim 14, wherein the ratio by weight of Ni to said metal-bearing silicate is 5/100 to 46/100.

16. The method for producing an exhaust gas cleaning catalyst complex according to claim 11, wherein the step of supporting said nickel oxide powder on said noble metal catalyst layer is carried out by wash-coating.

17. The method for producing an exhaust gas cleaning catalyst complex according to claim 16, wherein the ratio by weight of Ni to said metal-bearing silicate is 2/100 to 51/100.

18. The method for producing an exhaust gas cleaning catalyst complex according to claim 17, wherein the ratio by weight of Ni to said metal-bearing silicate is 5/100 to 46/100.

* * * * *